UNITED STATES PATENT OFFICE.

SOLOMON RICHMAN, OF NEW YORK, N. Y., ASSIGNOR TO NATIONAL ENAMELING AND STAMPING COMPANY, OF NEW YORK, N. Y., A CORPORATION OF NEW JERSEY.

COMPOSITION OF MATTER.

SPECIFICATION forming part of Letters Patent No. 724,043, dated March 31, 1903.

Application filed January 6, 1902. Serial No. 88,637. (No specimens.)

*To all whom it may concern:*

Be it known that I, SOLOMON RICHMAN, a citizen of the United States, and a resident of the city of New York, borough of Manhattan, in the county and State of New York, have invented a new and Improved Composition of Matter, of which the following is a full, clear, and exact description.

My invention relates to the art of enameling metallic articles, such as articles made of iron or steel, and has for its object to provide an improved enamel for obtaining a mottled effect in enameling and for obtaining this result with certainty and expeditiously.

To this end I compound an enamel mixture, as will be described in detail hereinafter. I desire it to be understood, however, that the description sets forth only one specific instance of the practical application of my invention and that the scope of my invention is not restricted to this particular application, but is indicated definitely in the appended claims.

I first prepare a mixture which may consist of the following ingredients: feldspar, one hundred and twenty-five pounds; quartz, sixty pounds; fluor-spar, fifty-one pounds; borax, one hundred and fifty pounds; soda, thirty pounds; kryolith, fifteen pounds; saltpeter, ten pounds; magnesia, five pounds; oxid of antimony, eight pounds; china-clay, five pounds.

While I prefer to use the three ingredients first named—that is, feldspar, quartz, and fluor-spar—I may use a corresponding amount of feldspar only—that is, in the particular case mentioned two hundred and thirty-six pounds of feldspar. For the purpose of coloring I may add a small quantity of an appropriate agent, such as oxid of cobalt; but it will be understood that this may be omitted at will. The ingredients having been thoroughly pulverized are mixed together and then smelted in the usual manner. The gases contained in the mixture should be allowed to escape, and if this result cannot be obtained at one operation resmelting of the mixture will be resorted to. Thereupon the resulting substance is ground in water and mixed with a suitable proportion of ordinary pottery-clay, so that it will form a slimy mass. This mass is ground fine, so as to make it perfectly homogeneous. A suitable amount of this liquid or slimy enameling mass is put into a tank or other receptacle, and the iron or other metal article to be enameled is dipped into the enameling liquid. Before dipping it the article may be first thoroughly dried. After dipping the article is taken out of the enameling liquid and put into a drying-oven, where it is subjected to a heat of about 100° to 200° Fahrenheit or more. The drying should usually take about half an hour and is followed by burning or firing. At the end of this operation the article appears in a mottled condition, which I believe to be due to the presence of magnesia in the enameling mixture.

The treatment above described is sufficient to produce a finished article; but, if desired, another coating may be put over the mottled enamel to protect it—for instance, any ordinary transparent enamel. Other manners of finishing or continuing the treatment of the article may be employed, it being understood that my invention has particular reference to a composition of matter which will produce an enamel with mottled effect.

My improved composition of matter hereinbefore described produces a very artistic and permanent enamel, and I desire particularly to call attention to the fact that there are no metallic sulfates in the mixture which I employ and that one dipping, with subsequent heating or drying and firing, is sufficient to produce the mottled effect, while hitherto it has been necessary to employ an agent such as sulfate of copper or of some other metal.

I claim as my invention and desire to secure by Letters Patent—

1. As a new composition of matter, an enamel containing feldspar, borax, soda, kryolith, saltpeter, magnesia, oxid of antimony, and china-clay.

2. As a new composition of matter, an enamel consisting of feldspar, quartz, fluorspar, borax, soda, kryolith, saltpeter, magnesia, oxid of antimony, and china-clay, in about the proportions specified.

In testimony whereof I have signed my name to this specification in the presence of two subscribing witnesses.

SOLOMON RICHMAN.

Witnesses:
FRED C. SIEVERS,
A. H. LACHMAN.